United States Patent Office 3,113,077
Patented Dec. 3, 1963

3,113,077
FERMENTATIVE PRODUCTION OF OXYTETRA-CYCLINE BY A NEW SPECIES OF STREPTO-MYCES
Thomas H. Stoudt, Westfield, and Fred Tausig, Linden, N.J., assignors to Merck & Co., Inc., Rahway, N.J., a corporation of New Jersey
No Drawing. Filed Jan. 8, 1962, Ser. No. 164,984
4 Claims. (Cl. 195—80)

This invention relates to the production of antibiotics. More particularly, it is concerned with the production of oxytetracycline by a hitherto undescribed species of microorganism, herein called Streptomyces sp. MA–590.

The production of oxytetracycline by several species of microorganisms such as *Streptomyces rimosus*, *Streptomyces albus*, and *Streptomyces platensis* has been described in the art.

An object of the present invention is to provide processes for the production of oxytetracycline by a hitherto undescribed strain of Streptomyces herein called Streptomyces sp. MA–590. Other objects will be apparent from the detailed description of this invention hereinafter provided.

In accordance with the present invention, it is now found that oxytetracycline is produced by growing a previously undescribed species of Streptomyces, Streptomyces sp. MA–590, in suitable nutrient mediums under aerobic conditions. This species was isolated from a sample of soil collected in Rahway, New Jersey. This new microorganism has been designated Streptomyces sp. MA–590 in the culture collection of the Merck Sharp & Dohme Research Laboratories at Rahway, New Jersey. A culture thereof has been deposited with the Fermentation Section of the Northern Utilization Research Branch, United States Department of Agriculture, at Peoria, Illinois, and added to its permanent culture collection as NRRL 2963.

The new microorganism is readily distinguished from the oxytetracycline-producing culture *S. Rimosus* and *S. platensis* as will be readily apparent from the following table showing the morphological and cultural characteristics of the three species:

| Medium | Streptomycee rimosue Description from Bergey's Manual of Determinative Bacteriology, 7th Edition | Streptomyces sp. MA-590 | Streptomyces platensis NRRL-2364 |
|---|---|---|---|
| Gelatin | Aerial mycelium white. No soluble yellow pigment. No liquefaction. | Aerial mycelium and spores scant, white to light gray. No soluble pigment. Liquefaction 50% in 14 days. | Very slow liquefaction starting after about 12 days and still incomplete after 30 days. |
| Nutrient agar | No aerial mycelium, poor growth. Faint yellowish pigment. | Heavy growth of aerial mycelium and spores, Mist color (Plates 53–1B Reddish White M and P). Reverse brown. | No aerial mycelium and spores, substrate poor. Reverse Cream Yellow (R) to Citrine Drab (R). Slight brown soluble pigment. |
| Czapek's synthetic agar. | No aerial mycelium, very limited growth which is colorless and submerged. No soluble pigment. | Aerial mycelium and spores colorless, fair growth. Very little submerged mycelium. No soluble pigment. | Mycelium Pale Smoke Gray (R) darkening to Pale Mouse Gray (R) with tufts of white growth rising above the background. Reverse Deep Olive Buff (R) becoming Dark Olive Buff (R). No soluble pigment. |
| Asparagine agar | Aerial mycelium white to pallid Quaker drab. Faint yellow soluble pigment. | Abundant aerial mycelium and spores, mouse-gray, good growth. Margin of colonies white. Reverse light gray. No soluble pigment. | Moderate aerial mycelium and spores. Mycelium white during early growth, later irregularly pigmented ranging from Light Grayish Olive (R) to Chaetura Black (R). Reverse Pale Ochraceous Buff (R) becoming Tawny (R). No or very slight brown soluble pigment. |
| Starch agar | Aerial mycelium limited; poor, thin growth. Colonies cinnamon-drab. | Heavy aerial mycelium and spores; limited growth in substrate. Downy colonies light gray to dark gray. Reverse dark Brown. No soluble pigment. | Heavy aerial mycelium and spores. Mycelium. White becoming Pale Mouse Gray (R) with areas of black where growth heaviest. Reverse Cartridge Buff (R) to Cream Buff (R). No soluble pigment. |
| Glucose agar | Aerial mycelium mouse-gray; growth with dry, cracked surface. Yellowish-brown pigment. | Aerial mycelium and spores light gray to dark gray. Colonies with smooth powdery surface. Dark brown soluble pigment. | Aerial mycelium and spores moderate to good. Mycelium White to Pale Mouse Gray (R) becoming almost white. Reverse Chamois (R) becoming Honey Yellow (R). Yellowish-brown soluble pigment. |
| Milk | Aerial mycelium grayish-white; thick pellicle. Not peptonized. No change in pH. | Scant growth with no ring at surface. Complete peptonization in 14 days. No soluble pigment. pH alkaline. | (No record) |
| Potato | Aerial mycelium white to dark. Moderate, wrinkled growth. Yellowish-brown pigment. | Vegetative mycelium and spores light gray; Good growth; surface wrinkled and downy. Reverse of single colonies very dark brown. Very dark brown soluble pigment. | Very good aerial mycelium and spores, White to Pale Mouse Gray (R); substrate spreading, wrinkled. Brown soluble pigment. |
| Calcium malate agar | (No record) | No aerial mycelium or spores; light brown growth. Little growth in substrate in 14 days. Very small zone of calcium digestion, or none, in 14 days' incubation. No soluble pigment. | Heavy growth of aerial mycelium and spores. Mycelium Pale Quaker Drab (R) with patches of closely related colors as well as areas of black and white. Black pigment in areas of best growth. Reverse Pale Ochraceous Salmon (R) becoming Cinnamon Buff (R) to Clay Color (R). Very slight greenish-yellow soluble pigment. |
| Cellulose | Not decomposed | Slight growth. Cellulose not decomposed in 3 weeks. | No aerial mycelium and spores. Substrate barely visible microscopically. No soluble pigment. |
| Litmus milk | (No record) | Scant growth; small ring on surface. Complete peptonization in 14 days. Reaction alkaline. | Scant growth forming partial ring at surface. No coagulation or hydrolysis in 14 days; slow coagulation and peptonization occur in 30 days. Slight alkaline reaction. |
| Nitrites | Activity produced from nitrates | On organic and synthetic media, nitrates not reduced to nitrites after 2, 3, and 4 days of incubation. | (No record). |

| Medium | Streptomyces rimosus Description from Bergey's Manual of Determinative Bacteriology, 7th Edition | Streptomyces sp. MA-590 | Streptomyces platensis NRRL-2364 |
| --- | --- | --- | --- |
| Casein | (No record) | Rapidly hydrolyzed | Do. |
| Starch | Weakly hydrolyzed | Not hydrolyzed | Hydrolyzed. |
| Tyrosine agar | (No record) | No growth after 15 days of incubation | (No record). |
| Hydrogen sulfide test | do | Good growth. Medium not discolored. Reverse dark brown. | Do. |
| V. P. test | do | Negative | Do. |
| Emerson's agar | do | Dark gray spores. Very dark brown soluble pigment. | Do. |
| Bennett's agar | do | Heavy growth of aerial mycelium and spores; little growth in substrate. Reverse black. | Do. |
| Morphology | Conidia cylindrical, measuring 0.6 to 0.7 by 0.8 to 1.4 microns, spirals numerous. Aerial mycelium limited; Ochre-colored in center, colonial-buff at edge. Vegetative growth: Flat, smooth colonies with irregular edge. Yellow pigment. | Conidia spherical about 0.8 microns in diameter. Spores in straight chains; no spirals or hooked ends found. Mycelium branched, light gray to dark gray. Colonies somewhat raised, powdery. | Conidia ovoid, measuring 0.7 to 0.9 by 0.8 to 1.2 microns in loose to tight spirals. Mycelium branching, about 0.7 to 0.8 microns in diameter. Colonies slightly raised, powdery; margin entire; peripheral surface area white to gray in center. |

The new microorganism differs from *S. rimosus* in liquefying gelatin after a relatively short period of incubation and in producing heavy growth of aerial mycelium and spores on nutrient agar, Czapek's agar and Bennett's agar. Further, whereas *S. rimosus* reduces nitrate to nitrites, the new microorganism does not do so after 2, 3 and 4 days of incubation in both organic and synthetic nitrate media.

Streptomyces sp. MA-590 differs from *S. platensis* in producing heavy growth of aerial mycelium and spores on nutrient agar. It produces colorless aerial mycelium and spores on Czapek's agar, whereas *S. platensis* produces mouse gray aerial mycelium and spores on the same culture medium. On calcium malate agar the new microorganism grows very poorly and does not produce soluble pigments, whereas *S. platensis* grows heavily producing a greenish yellow soluble pigment on this medium. *S. sp.* MA-590 completely peptonizes milk in 14 days while *S. platensis* does so very weakly in 30 days. It does not hydrolyze starch whereas *S. platensis* does so.

Morphologically, the new microorganism differs from both *Streptomyces rimosus* and *Streptomyces platensis* in producing spherical spores on straight chains. *S. rimosus* produces cylindrical spores on numerous spirals, and *S. platensis* produces ovoid spores in loose to tightly closed spirals.

The above description of our new microorganism producing oxytetracycline is given as illustrative of suitable strains of Streptomyces sp. MA-590 which can be used in the production of oxytetracycline, but it is to be understood that the present invention is not to be limited to organisms answering this particular description. The present invention also contemplates the use of other species of Streptomyces sp. MA-590 which are mutants of the described organism such as those obtained by natural selection, or those produced by mutating agents for example, X-ray irradiation, ultraviolet irradiation, nitrogen mustards and the like.

In accordance with a further embodiment of the present invention, oxytetracycline is produced by growing Streptomyces sp. MA-590 or a mutant thereof in suitable nutrient mediums under aerobic conditions. In general, the nutrient mediums containing assimilable sources of carbon and nitrogen which are used for the production of oxytetracycline by the other oxytetracycline-producing species are also suitable for use with this new strain.

The examples which follow are illustrative of the methods by which Streptomyces sp. MA-590 can be used for the production and isolation of oxytetracycline.

EXAMPLE 1

*Production of Oxytetracycline by Fermentation*

A water spore suspension of an agar slant of Streptomyces sp. MA-590 was inoculated into a 250 ml. Erlenmeyer shake-flask containing 50 ml. of the following sterile medium:

|  | Percent |
| --- | --- |
| Soybean meal | 3 |
| Distillers' solubles | 0.75 |
| Salt | 0.25 |
| Glucose | 2.0 |
| Calcium carbonate | 1.0 |

After 72 hours' incubation at 28° C. on a rotary shaker, the growth is inoculated into a 2-liter Erlenmeyer shake-flask containing 750 ml. of the same sterile medium. This is incubated for 72 hours on a rotary shaker and used to inoculate 160 liters of the same sterile medium in the seed fermenter. The inoculated medium is incubated for 72 hours with agitation and aeration, and 40 liters of the resulting broth used to inoculate 510 liters of the same sterile broth in another fermenter. The resulting inoculated medium was incubated for 96 hours with agitation and aeration. The fermentation broth so produced assayed 100 $\mu$g./ml. of oxytetracycline.

EXAMPLE 2

*Recovery of Oxytetracycline*

One hundred fifteen gallons of a fermentation broth produced by growing Streptomyces sp. MA-590 as described in Example 1 and assaying 80 $\mu$g./ml. of oxytetracycline was adjusted to pH 1.9 with 50% sulfuric acid. Forty lbs. of diatomaceous earth was added and the broth was filtered to yield 112 gal. of filtrate containing 65 $\mu$g./ml. of activity. The filter cake was slurried in 55 gal. of water at 40° C., adjusted to pH 1.8, stirred for 30 minutes, and filtered. The two filtrates were combined. The 167 gal. thus obtained assayed 54 $\mu$g./ml., and contained a total of 34.1 g. of oxytetracycline activity. To this combined filtrate was added 275 lbs. of sodium chloride and the clear solution extracted twice in a two stage extractor with 70 gal. of normal butanol. The combined butanol extracts (140 gal., containing 34.4 g. oxytetracycline activity) were concentrated in vacuo at a maximum temperature of 35° C., to a final volume of 17.5 l. which solution assayed 2 mg./ml. of oxytetracycline.

This butanol solution was extracted twice with 9 l. of 1 molar disodium phosphate and once with 8 l. of 20% sodium chloride. The pH was adjusted to 9.2 with 30% sodium hydroxide when necessary, and the aqueous phases were passed through 8 l. of fresh butanol. The aqueous phases removed a total of 2.5 g. of activity.

The butanol phases were extracted with 4 l., 8 l., 6 l., 6 l., and 4 l. portions of distilled water, the pH being adjusted to 2.2 with 6 N hydrochloric acid. The total yields and relative purities were 0.6 g. (0.4 $\mu$g./mg.), 12 g. (230 $\mu$g./mg.), 6 g. (185 $\mu$g./mg.), 6 g. (260 $\mu$g./mg) and 2 l. (160 $\mu$g./mg.) respectively.

The second, third and fourth extracts were combined and concentrated under reduced pressure to a final volume of 1005 ml.

1000 ml. of the above solution was subjected to a countercurrent distribution in ten 2.5 l. separatory funnels, using equal volumes of wet, acidified butanol (pH 2.5) and dilute hydrochloric acid (pH 2.5) saturated with butanol. Each of the aqueous and butanol phases were checked for potency, and aqueous phases four through eight were selected. These were combined and concentrated under vacuum to a final volume of 550 ml.

250 ml. of the above concentrate, pH 1.0, was adjusted to pH 5.0 by the slow addition of 10% sodium hydroxide. After stirring for 20 minutes at room temperature the pH was readjusted to 7.0, and stirring continued for an additional hour. The amorphous precipitate was filtered, washed with some water, and sucked dry. The yield of crude base was 10.08 g.

The dry cake was slurried in 60 ml. methanol, and 12 ml. of a saturated solution of calcium chloride in methanol was added slowly with stirring. After 30 minutes 1 g. of activated charcoal was added and the mixture was filtered after an additional 20 minutes. The carbon cake was washed with 5 ml. of a saturated $CaCl_2$-methanol solution and 10 ml. of 1.5 normal methanolic hydrochloric acid. To the combined filtrate and washes was slowly added 7 ml. of concentrated hydrochloric acid. Slow stirring was continued for an hour and a half, after which the crystals were collected on a filter funnel, washed with 10 ml. of 1.5 N methanolic hydrochloric acid and 10 ml. of anhydrous methanol, and air-dried. The yield of oxytetracycline hydrochloride was 5.18 g. having a potency of 905 μg./mg. (97% pure).

A sample of the hydrochloride so obtained was recrystallized once from anhydrous methanol. 95 mg. of the pure, shiny crystals of hydrochloride thus obtained was dissolved in 5 ml. distilled water and the pH adjusted to 6.5 with sodium hydroxide. The crystals of free base, oxytetracycline, which formed were collected on a filter funnel, washed with some distilled water, and dried in vacuo at 56° C. to yield the anhydrous free base. This material had a potency of 990 μg./mg. It melted at 183–185° C., with decomposition, undepressed by an authentic sample of anhydrous oxytetracycline. Its infrared and ultraviolet spectra were identical with those of oxytetracycline in every respect.

Various changes and modifications of the invention can be made and, to the extent that such variations incorporate the spirit of this invention, they are intended to be included within the scope of the appended claims.

What is claimed is:

1. A process for producing oxytetracycline which comprises growing an oxytetracycline producing strain of Streptomyces sp. MA–590 (NRRL 2963) under aerobic conditions in a nutrient medium.

2. A process for producing oxytetracycline which comprises growing Streptomyces sp. MA–590 (NRRL 2963) under aerobic conditions in a nutrient medium.

3. A process for producing oxytetracycline which comprises growing Streptomyces sp. MA–590 (NRRL 2963) in a nutrient medium under aerobic conditions until substantial antibacterial activity is imparted to said medium.

4. A process for producing oxytetracycline which comprises growing Streptomyces sp. MA–590 (NRRL 2963) in a nutrient medium containing assimilable sources of carbon and nitrogen until substantial antibacterial activity is imparted to said medium, and recovering oxytetracycline from the resulting fermentation broth.

References Cited in the file of this patent

UNITED STATES PATENTS 2,516,080  Sobin et al. _____ July 18, 1950